United States Patent Office 2,769,832
Patented Nov. 6, 1956

2,769,832

MANUFACTURE OF AROMATIC NITRILES

Edward L. Reilly, Woodbury, N. J., assignor to E. I. du Pont de Nemours and Company, Wilmington, Del., a corporation of Delaware No Drawing. Application February 26, 1954, Serial No. 412,957

7 Claims. (Cl. 260—465)

The present invention relates to a process for the production of aromatic nitriles. More specifically, the present invention relates to a process for the production of aromatic nitriles by the reaction of nitric oxide and N-alkyl-substituted aromatic amines in the presence of a sliver-on-silica catalyst.

Nitriles are well known starting materials and intermediates in innumerable organic syntheses. The usual method of preparing aromatic nitriles, i. e. by the reaction of a diazonium salt and potassium cyanide, involves expensive starting materials. A recently described process for the preparation of aromatic nitriles by the partial oxidation of alkyl-substituted benzenes in the presence of ammonia has the disadvantage that the reaction with dialkyl-substituted benzenes produces hard-to-separate mixtures of nitriles.

The object of the present invention is to provide a process for the manufacture of aromatic nitriles. Another object of the present invention is to provide a simple, one-step process for the manufacture of aromatic dinitriles. A further object is to provide a simple process for the manufacture of terephthalonitrile. Additional objects will become apparent as the invention is further described.

I have found that the foregoing objects can be accomplished by the reaction of an N-alkyl-substituted aromatic amine and nitric oxide at elevated temperatures in the presence of a silver-on-silica catalyst. The reaction is preferably carried out in the vapor phase to allow a more intimate mixture of the reactants and a greater contact with the catalyst. The liquid phase reaction is also feasible, but elevated pressures sufficient to maintain the liquid phase would be required. Generally, the reactants are heated to the reaction temperature in a preheater before being passed over the catalyst bed.

The silver-on-silica catalyst is prepared by impregnation of silica with diamine silver (I) hydroxide followed by reduction of the silver compound to silver by heat.

The following examples illustrate specific embodiments of the method of carrying out the present invention. It should be understood, however, that they are illustrative only and are not to be taken as limiting the invention.

Example 1

Ten grams of N,N-dimethyl-p-toluidine was heated to approximately 500° C. and passed into a reactor containing a pre-heated mixture of 11 parts by volume of nitric oxide and 89 parts of nitrogen. The mole ratio of nitric oxide to the dimethyl-toluidine was 4 to 1. The mixture was passed over a silver-on-silica catalyst at a space velocity of 600 hours$^{-1}$ and a temperature of 500° C. The terephthalonitrile formed was condensed in a receiving flask and recovered in a 23% yield.

Example 2

Twenty grams of N-methyl-p-toluidine was heated to approximately 500° C. and the vapor was passed into a vessel provided with a silver-on-silica catalyst bed having a diameter of 3.2 cm. and a height of 9.3 cm. and filled with a heated mixture of 11 parts by volume of nitric oxide and 89 parts of nitrogen. The reaction mixture, in which the nitric oxide/toluidine mole ratio was 3/1, was passed over the catalyst bed at a space velocity of 600 hours$^{-1}$ and a temperature of 500° C. The terephthalonitrile produced was recovered in a 20% yield.

Example 3

Sixty grams of N-methylaniline was heated to approximately 500° C. and passed into a reaction vessel containing a mixture of 11 parts by volume of nitric oxide and 89 parts of nitrogen and provided with a catalyst bed having a diameter of 3.2 cm. and a height of 25 cm. The mixture, in which the mole ratio of nitric oxide to methylaniline was 1.8 to 1, was passed over the catalyst at a space velocity of 620 hours$^{-1}$ and a temperature of 500° C. The benzonitrile produced was separated from the unreacted amine in the organic layer by the addition of hydrochloric acid and recovered in an 18% yield.

The nitric oxide is generally diluted with an inert gas such as nitrogen, and, if desired, a solvent such as benzene to moderate the reaction. A nitric oxide mixture such as would be obtained by air oxidation of ammonia, i. e. one containing about 10% nitric oxide, may be used.

The nitric oxide reacts with secondary and tertiary aromatic amines such as N-methylaniline, N,N-dimethylaniline, N-methyltoluidines, and N,N-dimethyltoluidines to produce the corresponding nitriles. Reaction temperatures of between 450 and 550° C. and nitric oxide/amine mole ratios of between 1/1 and 5/1 are preferred. Experimental data indicate that for the alkyl-substituted aromatic amines, the mechanism may involve the nitrosation of the amine group and rearrangement to the nitrile group followed or accompanied by the reaction of the nitric oxide and the alkyl group to form the nitrile. The possible sequence of reactions may be shown by N-methyl-p-toluidine as follows:

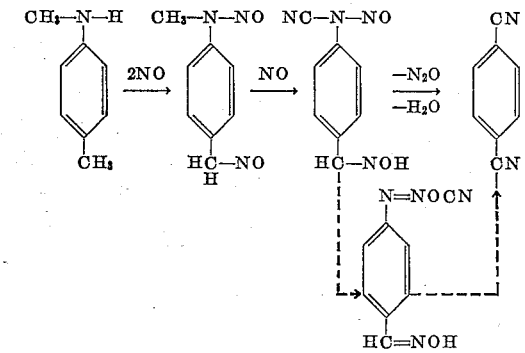

Although the invention has been described in detail in the foregoing description, it is apparent that many variations may be made without departing from the basic concept of the invention. I intend, therefore, to be limited only in accordance with the following claims.

I claim:

1. A process for the manufacture of aromatic nitriles comprising bringing nitric oxide and an N-methyl-substituted aromatic amine into contact in the presence of a silver-on-silica catalyst at a temperature of from 450 to 550° C.

2. A process for the manufacture of aromatc nitriles comprising the vapor phase reaction of nitric oxide and an N-methyl-substituted aromatic amine in the presence of a silver-on-silica catalyst at a temperature of from 450 to 550° C.

3. A process for the manufacture of aromatic nitriles according to claim 2 in which the mole ratio of nitric oxide to the N-methyl-substituted aromatic amine is between 1 to 1 and 5 to 1.

4. A process for the manufacture of terephthalonitrile comprising passing a preheated mixture of N,N-dimethyl-p-toluidine vapor and nitric oxide over a silver-on-silica catalyst at a temperature of from 450 to 550° C.

5. A process according to claim 2 in which the aromatic amine is an N-methyl-substituted aniline.

6. A process according to claim 2, in which the aromatic amine is an N-methyltoluidine.

7. A process according to claim 2 in which the aromatic amine is N-methyl-aniline.

References Cited in the file of this patent

Lippmann et al.: Ber. Deut. Chem., vol. 13, pp. 2136–38 (1880).